Nov. 5, 1940.  T. E. ALLISON  2,220,139
BAG PACKING DEVICE
Filed Feb. 1, 1940
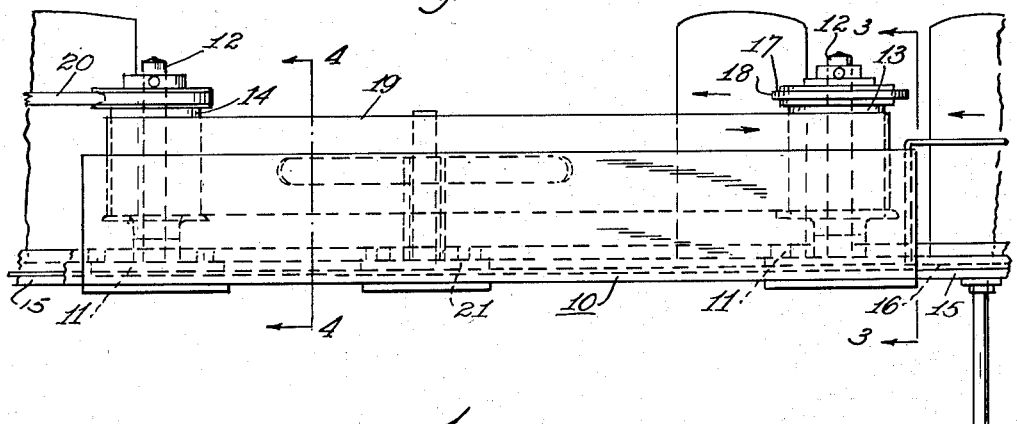
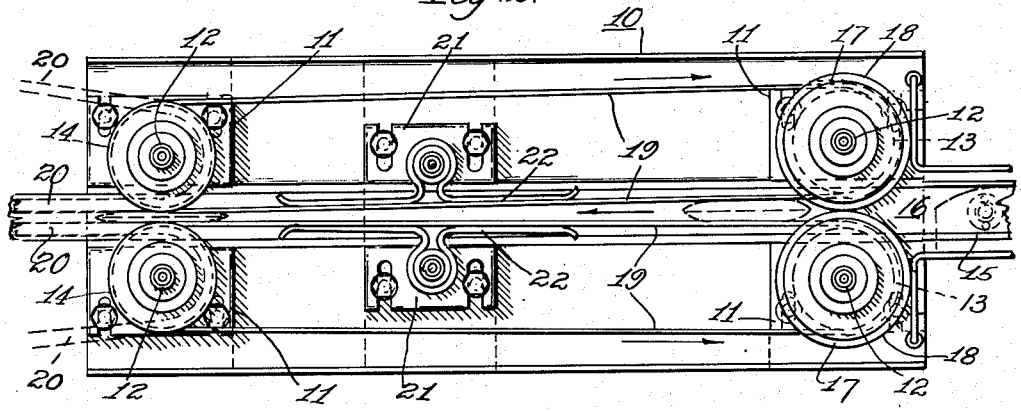
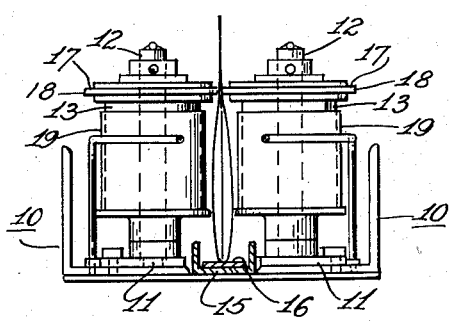
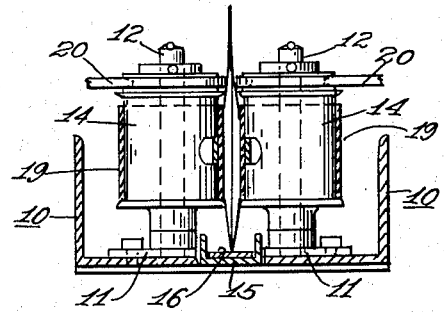
Inventor
Thomas E. Allison
by James R. McKnight
his Attorney Patented Nov. 5, 1940

2,220,139

UNITED STATES PATENT OFFICE 2,220,139

BAG PACKING DEVICE

Thomas E. Allison, Chicago, Ill., assignor to Continental Coffee Company, Inc., Chicago, Ill., a corporation of Illinois Application February 1, 1940, Serial No. 316,791

2 Claims. (Cl. 226—56)

My invention relates to a construction for closing the open mouths of recently packed bags and for compressing the contents thereof so that the bags may be prepared for sealing and shipment.

In the filling of bags with ground coffee, sugar or the like, the filling operation leaves the bags with spread top walls and wide open mouths. The coffee tends to fall to the bottom of the bags and form a bulge therein, again distorting the shape of the bag and making it difficult, if not impossible, to seal or ship in that condition. To correct this condition requires that the bags be each lifted out, patted, and the upper ends brought together. This took time, involved substantial labor costs and provided uneven and poor results. My invention was created to solve the above problems and to provide a construction which would evenly and uniformly bring the side walls together and close the wide open mouths of the bags and also compress the contents to eliminate the bulges and present a firm, evenly distributed package, which could be easily sealed and properly shipped. My invention has resulted in greater speed of operation, substantial economy in labor and other costs, uniformity of operation and result, and an improved product. My invention also contemplates such other objects, advantages and capabilities as will later more fully appear and which are inherently possessed by my invention.

While I have shown in the accompanying drawing a preferred form of my invention, yet I desire it understood that the same is susceptible of modification and change without departing from the spirit of my invention.

Referring to the drawing, Fig. 1 is a side elevation of a device made in accordance with my invention; Fig. 2 is a top plan view; Fig. 3 is a detailed sectional view of the front rollers on line 3—3 of Fig. 1; Fig. 4 is a detailed sectional view of the rear rollers on line 4—4 of Fig. 1.

The embodiment selected to illustrate my invention comprises a frame 10 to the front and rear portions of which are attached adjustable spaced base members 11. To said base members are rotatably attached studs 12 on which rotate spaced front and rear rollers 13 and 14 respectively. A trough 15 has a portion attached to said frame 10 and extends before and beyond said frame. In trough 15 is a movable conveyor 16 adapted to receive and carry bags filled with ground coffee or the like.

Adjacent the tops of each of the spaced front rollers 13 is a ring 17 with an outer surface 18 of nonslip material, such as rubber or the like. The surfaces 18 of opposite rings 17 extend very close together with very little space therebetween.

An endless belt 19 travels between each front roller 13 and each rear roller 14 on the same side, so that there are a pair of spaced belts 19. Another belt 20 contacts the upper portion of the rear rollers 14 and is moved by any desired source of power so as to move the rear rollers 14 and through belts 19 the front rollers 13.

A pair of adjustable supports 21 are attached to the frame 10 adjacent the middle portion, and carry a pair of spaced flat spring members 22 which bear against the belts 19 to keep the space therebetween substantially even.

The base members 11 for the rear rollers 14 are positioned so that said rear rollers are slightly closer together than the front rollers 13.

In use a plurality of bags filled with ground coffee or the like are placed on the conveyor 16 before the front rollers are reached. In practice the bags have just been filled with the ground coffee and the walls of the bags are spaced, leaving wide open mouths. In this condition it would be very difficult to seal the bag. The ground coffee is also in a lump at the bottom of the bag and presents an unattractive bulge. When each of the bags approaches the front rollers 13 it is first contacted by the outer nonslip surfaces 18 of rings 17. The opposite surfaces 18 press the walls of the bag together at their upper portions, shutting the wide open mouth and preparing the bag so that it may be easily and properly sealed.

The bag then passes between the oppositely disposed and spaced front rollers 13 and contacts on each side the surfaces of the oppositely disposed and spaced belts 19. The front rollers 13 are so spaced by their base members 11 that the belts 19 will press against the walls of the bag and flatten the contents so that the same are spread more evenly throughout the lower and middle portions of the bag. This provides a better distribution and removes the bottom bulge from the bag. The journey between the belts 19 tends to make the packing more firm and solid. The rear rollers 14 being even closer to each other give the bag a final squeeze as it passes therebetween to make the package distribution more compact and hard, so that the bag will retain the desired shape during the completion of the packing, shipment and delivery.

The bags then continue on the conveyor beyond the frame 10 for sealing. They are then ready for commercial sale.

Having thus described my invention, I claim:

1. A bag packing device comprising a frame, a pair of spaced front base members adjustably attached to the front portion of said frame, a pair of spaced rear base members adjustably attached to the rear portion of said frame, a pair of spaced front rollers rotatably mounted on said front base members, a pair of spaced rear rollers rotatably mounted on said rear base members, a trough having a portion attached to said frame and extending below and between said rollers, a movable conveyor within said trough, an endless belt extending from and between one of the rear rollers and the front roller on the same side, another endless belt extending from and between the other rear roller and the front roller on the same side, means attached to said rear rollers for moving said rollers and in turn said belts and said front rollers, said conveyor adapted to carry bags containing compressible material, said conveyor having a portion ahead of the frame for receiving said bags just recently filled with compressible material forming a bulge at the bottoms of the bags and with wide open mouths, said front rollers each having an upper non-slip ring attached thereto, said rings extending to almost contact each other and upon contacting the upper portions of said bags to close the wide open mouths of the same, said front base members positioned toward each other to space the opposite belts carried by the front rollers a distance slightly larger than the thickness desired for the filled bags, so that said belts upon contacting said bags compress and spread the material therein so that the bulge of the material at the bottom of the bags is eliminated and the material evenly distributed throughout the lower and middle portions of the bags, a pair of oppositely disposed resilient members attached to said frame positioned so as to contact the back of the belt adjacent thereto so that the space between the belts is maintained, said belts continuing to compress the material in the bags to make the packing more firm and solid, said rear base members being positioned more closely toward each other than the front base members to space the opposite belts carried by the rear rollers a distance substantially the thickness desired for the filled bags so that said belts give the bags a final squeeze as they pass therebetween to make the package compact, hard and shape retaining, said conveyor having a portion beyond said frame for carrying said bags for further attention.

2. A bag packing device comprising a frame, a pair of spaced front base members adjustably attached to the front portion of said frame, a pair of spaced rear base members adjustably attached to the rear portion of said frame, a pair of spaced front rollers rotatably mounted on said front base members, a pair of spaced rear rollers rotatably mounted on said rear base members, a movable conveyor extending below and between said rollers, an endless belt extending from and between one of the rear rollers and the front roller on the same side, another endless belt extending from and between the other rear roller and the front roller on the same side, means attached to said rear rollers for moving said rollers and in turn said belts and said front rollers, said conveyor adapted to carry bags containing compressible material, said conveyor and its forward portion receiving said bags just recently filled with compressible material forming a bulge at the bottoms of the bags and with wide open mouths, said front rollers each having an upper non-slip ring attached thereto, said rings extending to almost contact each other and upon contacting the upper portions of said bags to close the wide open mouths of the same, said front base members positioned toward each other to space the opposite belts carried by the front rollers a distance slightly larger than the thickness desired for the filled bags, so that said belts upon contacting said bags, compress and spread the material therein so that the bulge of the material at the bottom of the bags is eliminated, and the material evenly distributed throughout the lower and middle portions of the bags, said rear base members being positioned more closely toward each other than the front base members to space the opposite belts carried by the rear rollers a distance substantially the thickness desired for the filled bags.

THOMAS E. ALLISON.